United States Patent Office 3,249,159
Patented May 3, 1966

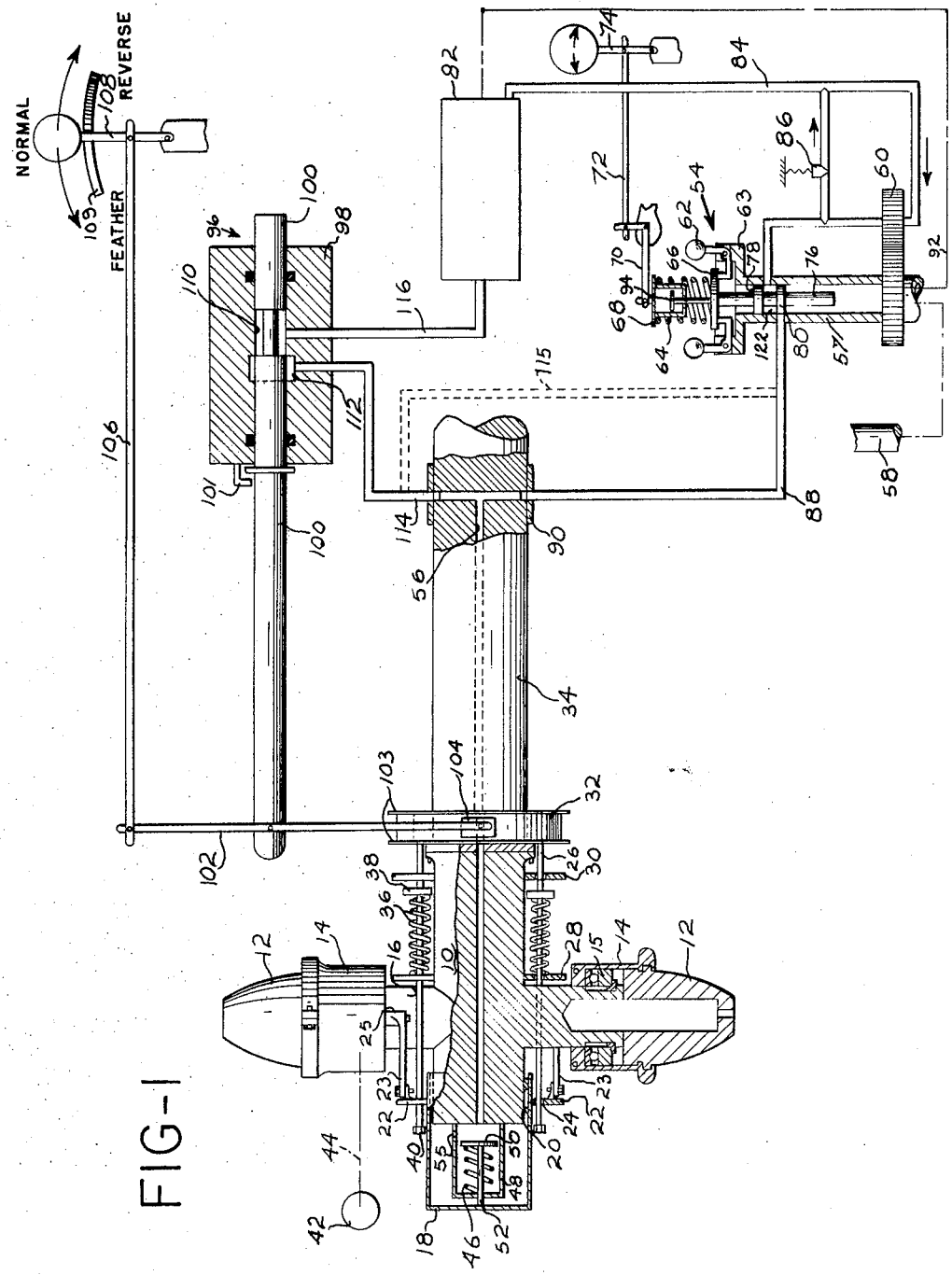

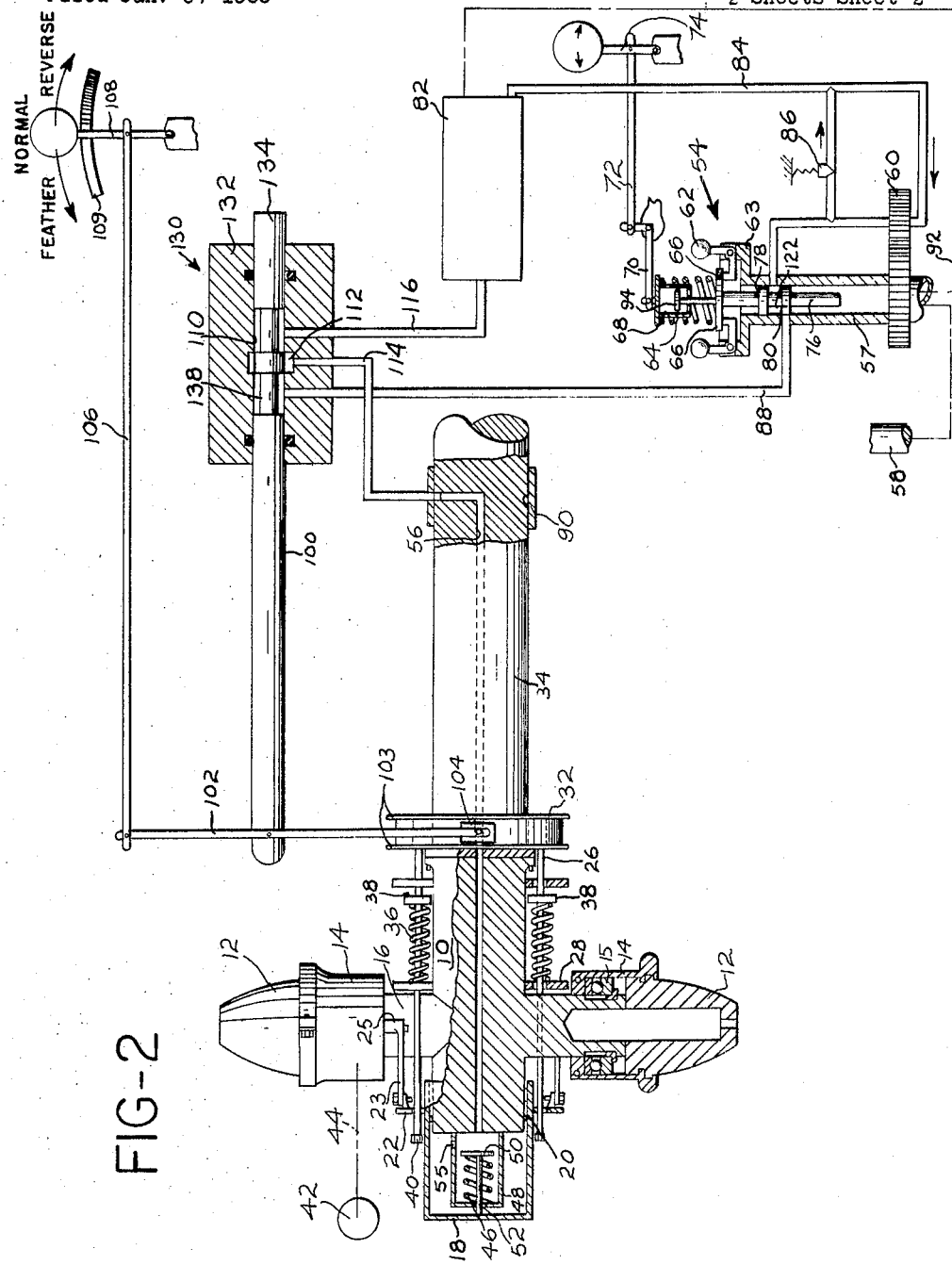

3,249,159
PROPELLER CONTROL SYSTEM
David Biermann, Piqua, Ohio, assignor to Hartzell Propeller Inc., Piqua, Ohio, a corporation of Ohio
Filed Jan. 6, 1965, Ser. No. 423,794
15 Claims. (Cl. 170—160.2)

This invention relates to airplane propellers and more particularly to an adjustable pitch and feathering propeller which may also be put into reverse pitch and the novel control mechanisms associated therewith.

Variable pitch propellers and pitch changing devices and control systems therefor are, of course, known. Generally these variable pitch propellers comprise a propeller hub, propeller blades extending from the hub and rotatably mounted thereon, and electrical, mechanical or fluid operated control means for adjusting the pitch of the propeller blades by rotating them about their longitudinal axes.

The present invention relates to an adjustable pitch propeller and is of the hydraulically operated type having control means for regulating the pitch thereof and comprises a constant speed governor, means for reversing the pitch of the propeller independently of the governor and means for feathering the propeller.

The present invention utilizes the general principle of operation as was disclosed in the patent to Biermann, No. 3,057,410, which issued October 9, 1962. In that patent, however, the construction was limited to propellers which were installed on engines having a hollow drive shaft and a servo control rod extended through the shaft up to the pitch changing mechanism.

In the instant application, the construction is not limited to those arrangements which utilize a hollow drive shaft but may be installed on any propeller driving shaft. A particular feature of this invention is that the control means are external of the engine driving shaft.

A principal object of this invention is to provide a novel control means for an adjustable pitch propeller in which the control means are external of the propeller driving shaft.

A further object is to provide an adjustable pitch, feathering, and reversible pitch propeller which is economical to produce, of simplified construction, and can readily be adapted to any propeller driving shaft.

A further object is to provide an adjustable reversible pitch propeller which can be reversed independently of the constant speed governor used in the propeller construction.

These and other objects and advantages will be further explained in the following description and accompanying drawings in which:

FIGURE 1 is a generally schematic diagram of the propeller hub together with the diagram of the constant speed type controlling governor and a separate reversing and feathering valve; and FIGURE 2 is a diagram similar to FIGURE 1 showing a modified construction of the reverse and feathering valve.

Referring to the drawings in more detail, the first embodiment of this invention as shown in FIGURE 1 consists of a hub generally designated 10 which carries a plurality of radially extending blades 12 which are secured to the hub by known clamps 14 which are rotatably mounted on radial arms 16 of hub 10 with suitable bearings 15 being shown.

A piston means 18 is slidably mounted for axial movement on hub 10 as shown and suitable seals 20 are located therebetween to provide a fluid tight seal.

On the outside of the piston 18 there are abutment members 22 which are integrally formed therewith and which members are provided with holes 24 through which guide rods 26 pass. One end of link member 23 is pivotally joined to abutment 22 and the other end is pivotally joined to blade clamp 14 by link pin 25 to operatively connect the piston means 18 with the blades 12.

The guide rods 26 pass through apertures which are in abutment members 28 and 30 which are fastened to the hub 10 and the rods move axially therealong.

One end of each of the rods 26 is secured to yoke means 32 which surrounds the engine shaft and moves axially relative to shaft 34. Yoke 32 is positioned normal to shaft 34 and is retained in that position by spring member 36 in conjunction with abutment 28 and collar 38 which is made integral with guide rod 26. The spring 36 is positioned between the abutment and collar and tends to push the collar 38 against the abutment 30 at all times unless an opposing force is exerted on the guide rod 26 tending to move it to the left as viewed in FIGURE 1.

Such an opposing force is provided by piston means 18 when it moves toward the left beyond a certain predetermined position which is determined by the location of adjustable nut 40 mounted on the left ends of guide rods 26. The nuts will engage abutments 22 when the piston means 18 moves to the left a predetermined amount.

The principal forces acting on the blades to change the pitch thereof in one direction are caused by counterweights 42 which are attached to clamps 14 by means of counterweight extensions 44. These counterweights are weighted to overcome the centrifugal twisting movement of the blades which tends to move the pitch into a zero pitch position. Hence, the counterweights 42 are sufficiently heavy to tend to move the blades into the high pitch position.

Another force acting on the blades to change the pitch thereof in the high pitch direction is caused by spring member 46. This spring is mounted in a spring cup 48 which is fixed to hub means 10 as shown. The other end of the spring bears against a flange 50 which is secured to a rod 52. The rod passes through an aperture in cup 48 and the end of the rod is secured to piston means 18. The spring thereby tends to move the piston means to the right as shown in FIGURE 1, tending to augment the force contributed by counterweights 42.

The spring force is independent of the position of the counterweights and the centrifugal force acting on the counterweights, both of which determine the counterweight force; hence, the spring 46 is utilized primarily for moving the propeller pitch into the feathered position when the counterweights are no longer effective due to their position and the fact that the rotational speed may be approaching zero. The spring 46 is also effective in moving the pitch out of the reverse position when the counterweight position is such as to contribute little or no force tending to move the propeller blades out of the reverse position.

During normal operation, however, the counterweight force is dominant between low pitch and high pitch at which time the value may be greater than the spring force.

During forward flight under normal take-off and cruising conditions, the pitch of the propeller is controlled by means of a governor generally designated 54, which supplies oil through an oil passage 56 in the engine shaft, which leads to the spring cup 48, which has a suitable aperture 55 leading to piston means 18.

The governor 54 consists of a hollow shaft 57 which is shown operatively connected to shaft 58 which is driven by the engine shaft. On the lower end of shaft 57 there is a gear which drives gear pump 60 and at the upper end of shaft 57 the flyballs 62 are rotated with the shaft by the flange means 63.

The centrifugal force acting on the flyballs 62 is opposed by speeder spring 64 which is mounted between mushroom 66 and spring cup 68. The spring cup 68 is axially adjustable by means of bell crank 70, link 72, and control handle 74. Attached to the mushroom 66 is pilot valve 76 which is slidably mounted in hollow shaft 57.

The pilot valve 76 carries control pistons 78 and 80 in spaced relation thereon as shown. The governor 54 receives engine oil from oil sump 82 which passes through suction line 84. The pressure within the governor itself is limited by relief valve 86 which is arranged to bypass oil from the outlet side of pump 60 back to suction line 84. Oil under pressure exhausting from the governor 54 enters the engine shaft through line 88 and oil seal 90 surrounding the engine shaft and then passes into oil passage 56. Oil from the piston means 18 is also returned back through oil passage 56, oil transfer seal 90, oil line 88, and is discharged into the hollow cavity in shaft 57 to the engine oil sump 82 through drain pipe 92, which is shown as a line. A suitable oil transfer seal (not shown) is used to connect hollow shaft 57 with drain pipe 92.

In order to feather the propeller, the governor can be over-ridden when the control lever is moved to the extreme right as viewed in FIGURE 1. This movement of the lever causes spring cup 68 to move upwardly until it contacts button member 94 which is attached to pilot valve 76. This causes pilot valve 76 to rise against the action of speeder spring 64 and allows oil to drain from the piston means 18 back into sump 82, thereby causing the pitch of the blades to move into the feathered position due to the action of the counterweights 42 and the spring 46.

This method of control is generally covered in the Biermann Reissue Patent 24,530, which describes a method of feathering a constant speed propeller. In addition, the present invention provides for means to override the low pitch stop thereby allowing the pitch to go into reverse pitch position as follows.

The low pitch stop of this invention is of the hydraulic type similar in principle to that described in the Biermann Patent 3,057,410, except in the present invention, the hydraulic stop is mounted externally to the engine shaft, as shown in the embodiments of FIGURES 1 and 2. This hydraulic stop in FIGURE 1 is identified as the reverse and feathering valve 96.

This valve 96 consists of a valve body 98 in which a spool member 100 is axially slidably mounted. One end of spool member 100 is pivotally connected to lever 102 to form a fulcrum point. One end of lever 102 is pivotally mounted on block 104 which rides between the flanges 103 of yoke 32 for axial movement therewith. The other end of lever 102 is pivotally connected to link 106 which in turn is pivotally connected to reverse control lever 108 at a point between the upper and lower extremities thereof. The lower end of lever 108 is pivotally mounted to the frame and a suitable scale 109 is provided for the propeller blade angle from low to reverse pitch.

The spool member 100 has a reduced diameter portion thereon to provide a recess 110 in cooperation with valve body 98. The valve body 98 is also provided with an annular recess 112 which communicates with the oil transfer seal 90 by a conduit 114. An optional conduit 115 may also be used to connect the recess 112 with oil line 88.

Recess 110 in the valve 96 is open to drain line 116 which connects to oil sump 82. The reverse and feather valve 96 acts as a low pitch stop when lever 108 is in the normal flight position as shown. The low pitch stop is normally substantially closed as shown in FIGURE 1 (except for slight leakage) to the passage of oil from the propeller back to the oil sump 82 as the recess 110 does not connect with recess 112.

The hydraulic low pitch stop becomes effective as a stop when the valve spool member 100 is moved to the left as viewed in FIGURE 1. This opens the passage between recess 112 and recess 110 allowing oil to drain freely back out of piston means 18, preventing it from further moving into the reverse pitch position or to the left. This action is accomplished when piston 18 moves to the left as viewed in FIGURE 1 to the point where piston abutment 22 engages adjustable nut 40 and moves guide rods 26, yoke means 32, and block 104 to the left.

This action in turn moves valve spool member 100 to the left via lever 102 opening the passage between recesses 112 and 110 allowing oil to flow from the piston means 18 back into oil sump 82. This opening must be sufficient to provide for the full flow from the governor to be exhausted back to the oil sump since at this time the governor is normally supplying oil to the propeller when the rotational speed is below the value for which the governor is adjusted.

In order to move the pitch of the blades into a reduced value or into full reverse pitch, control lever 108 is moved to the right, which in turn moves spool member 100 to the right, closing the passage between recesses 112 and 110, and thereby preventing the oil from being exhausted from piston means 18. Under these conditions, the governor will continue to supply oil to piston means 18, moving it to the left or reverse pitch position. It will move the piston only as far as the hydraulic low pitch valve will permit, i.e., when the spool member 100 is moved to the left opening the passage between recesses 112 and 110.

By this means it is possible to position the pitch of the propeller at any intermediate value between the normal low pitch value and the full reverse pitch value by the proper selection of the position of the reverse pitch lever 108. The precise pitch desired can be determined by referring to the graduation on scale 109.

The pitch of the propeller can be returned from the reverse pitch position by moving lever 108 back to the normal flight position. This action opens the passage between recesses 112 and 110 allowing oil to drain from piston means 18 back to oil sump 82 by the action of spring 46. When the piston 18 moves away from the reverse pitch position, spring 36 provides the necessary force to hold nuts 40 against the pertaining abutments 22, thereby moving guide rods 26, yoke member 32, block 104, lever 102 and spool member 100 to the right. When spool member 100 moves to the point where recess 112 is closed to recess 110, further draining of the oil from piston means 18 ceases and the piston 18 stabilizes in the low pitch position.

As it is possible to feather the propeller by means of overriding the action of the governor 54, as described above, it is also possible to feather the propeller by opening the passage between recesses 112 and 110. This is done by moving control lever 108 to the left as viewed in FIGURE 1 from the normal position. The oil is then drained from piston means 18 back to oil sump 82 by the action of counterweights 42 and spring 46.

The embodiment shown in FIGURE 2 utilizes a somewhat different control means which differ only with respect to the hydraulic connections made with the governor and the reverse and feather valve. In this embodiment the governor is not directly connected to the propeller but is first connected to the reverse and feather valve generally designated 130. Valve 130 is similar to valve 98 except that the valve body 132 is connected to conduit 88 leading to the governor, in addition to the conduits 114 and 116 which correspond to the FIGURE 1 modification. The valve 132 has a spool member 134 which is axially slidable in valve body 132 and has reduced diameter portions to provide recesses 110 and 138 in cooperation with the valve body. Recess 110 corresponds to recess 110 of valve 96. Also, recess in valve body 132 corresponds to recess 112 in valve body 98.

In operation, if valve spool member 134 is moved to the right, it opens the passage between recess 138 and 112, providing a hydraulic communication between governor 54 and piston means 18. If the spool member 134 is moved to the left, it closes the passage between recesses 138 and 112 but opens the passage between recesses 112 and 110. This not only cuts off the supply of oil from the governor, but also opens the drain leading from the piston means 18 back to the oil sump 82. This arrangement is somewhat more positive than the one shown in FIGURE 1 as the drain system is not required to carry the flow from the governor in addition to the flow from piston means 18.

In FIGURE 2, spool member 138 is shown in the position for low pitch stop operation. This position is determined by the balance of leakage flow from the governor equaling the leakage flow draining back into oil sump 82. It must be emphasized that some leakage through the valve porting is essential for the operation of the systems; otherwise, if the passage between recesses 138 and 112 and between recesses 112 and 110 were completely sealed, the propeller would become locked in the low pitch position and it would be impossible for oil to drain from piston means 18 back through recesses 112 and 138 into governor 54 and oil sump 82 by the action of counterweights 42 and spring 46. The governor must have some communication with piston means 18 during the time when the propeller is at the low pitch stop; otherwise, it would not be possible for the governor to call for a higher pitch and move the propeller away from the low pitch position. The operation of the second modification is generally the same as the first modification so a discussion of the first modification will follow.

*Control of the propeller pitch normal operation, low pitch to high pitch*

In normal operation, the reverse and feathering lever 108 remains in the central of normal flight position as shown in FIGURE 1 and the governor control lever 74 is set for the desired r.p.m. Under these circumstances, the governor supplies oil to the propeller tending to reduce the pitch thereof in opposition to the forces of counterweights 42 and spring 46. When the r.p.m. for which the governor is adjusted is exceeded, flyballs 62 raise pilot valve 76, first closing off the passage 122 to oil line 88 and opening the passage from oil line 88 to the center of hollow shaft 57. This action allows counterweights 42 and spring 46 to increase the pitch, thereby slowing down the r.p.m. to the desired value.

If the rotational speed of the engine is below the speed for which the governor is set, the speeder spring 64 moves the pilot valve 76 down, opening the passage between passage 122 and line 88, allowing oil to move piston means 18 to the left against the action of counterweights 42 and spring 46, thereby reducing the pitch of the blades to allow an increase in rotation speed.

*Feathering*

Feathering may be accomplished by either moving governor control lever 74 to the right as shown or moving the reversing lever 108 to the left as shown. In either case the action of the governor 54 is overridden since the drain line through the governor or through reverse and feather valve 96 is open allowing oil to flow from piston means 18 back to oil sump 82 through the action of counterweights 42 and spring 46.

*Reversing*

At any time that the engine speed is below that set by the governor, the governor is calling for a reduced pitch. This may occur when the aircraft is coming in for a landing or when it is on the ground. The propeller is prevented from going into reverse by the action of reversing valve 96 by virtue of the fact that when the piston means 18 reaches the low pitch position, it then moves the mechanical linkage connecting it with spool member 100, causing the drain passage from the propeller to the sump to open. The governor can no longer move piston means 18 as it can no longer build up a fluid pressure to overcome the action of spring 46 and the counterweights 42. Reversing is accomplished by repositioning spool member 100 so that it will not open until the piston has moved into the reverse pitch position or some intermediate position.

Return to low pitch from reverse position is accomplished by moving lever 108 to the normal or low pitch position which opens the drain from piston means 18 to the sump 82 so that oil can freely flow out of piston means 18 by the action of spring 46 and counterweights 42. The pitch will stabilize in the low pitch position by the action of the piston means 18 returning the spool member 100 to the neutral position whereby the drain to the sump is closed and the passage from the governor to the propeller is reestablished.

It will be understood that this invention is susceptible to modification in order to adapt it to different usages and conditions and accordingly, it is desired to comprehend such modifications within this invention as may fall within the scope of the appended claims.

What is claimed is:

1. In a variable pitch propeller; a hub adapted to be rotated with an engine shaft, propeller blades rotatably mounted in said hub, first means acting on said blades for changing the pitch thereof in one direction toward maximum pitch and a feathered position and comprising centrifugally responsive counterweights secured to said blades and spring means operatively connected between said hub and said blades, second means operatively connected between said hub and said blades for changing the pitch thereof in a direction opposite to said one direction towards minimum pitch and reverse pitch and comprising a hydraulic motor, means for supplying fluid under pressure to said motor, valve means external of said shaft and said hub for diverting the supply of fluid to said motor back to its source at a predetermined pitch value, and adjustment means for adjusting said valve means to obtain a range of pitch values at which said valve means diverts the said supply of fluid to said motor.

2. In a variable pitch propeller; a hub adapted to be rotated with an engine shaft, propeller blades rotatably mounted in said hub, first means acting on said blades for changing the pitch thereof in one direction toward maximum pitch and a feathered position and comprising centrifugally responsive counterweights secured to said blades and spring means operatively connected between said hub and said blades, second means operatively connected between said hub and said blades for changing the pitch thereof in a direction opposite said one direction towards minimum pitch and reverse pitch and comprising a hydraulic motor, a fluid reservoir, means for supplying fluid under pressure from said reservoir to said hydraulic motor, valve means external of said shaft and said hub for bypassing said fluid back to said reservoir when the pitch of the blades reaches a predetermined value, and adjustment means for adjusting said valve means to obtain a range of pitch settings at which said valve means becomes effective in bypassing fluid back to said reservoir.

3. In a variable pitch propeller; a hub adapted to be rotated with an engine shaft, propeller blades rotatably mounted in said hub, first means acting on said blades for changing the pitch thereof in one direction towards maximum pitch and a feathered position and comprising centrifugally responsive counterweights secured to said blades and spring means operatively connected between said hub and said blades, second means operatively connected between said hub and said blades for changing the pitch thereof in a direction opposite said one direction toward minimum pitch and reverse pitch and comprising a hydraulic motor, a fluid reservoir, means for supplying fluid under pressure from said reservoir to said hydraulic motor, valve means external of said shaft and said hub adapted to be moved to a position for bypassing fluid back to said reservoir thereby limiting fluid pressure in said hydraulic motor, and link means operatively connected between said hydraulic motor and said valve means to move said valve means into said position for bypassing fluid when the pitch of said blades reaches a predetermined value.

4. The propeller as claimed in claim 3 further comprising adjustment means for adjusting said link means to obtain a range of predetermined values at which said valve means limits the flow of fluid to said hydraulic motor.

5. A variable pitch propeller comprising; an engine drive shaft, a hub mounted on said shaft for rotation therewtih, propeller blades rotatably mounted in said hub, hydraulic piston means mounted on said hub for axial movement thereon, first link means connecting said piston means with said blades for changing the pitch thereof upon movement of said piston means, first means acting on said blades urging them in one direction to change the pitch thereof towards maximum pitch and a feathered position and comprising centrifugally responsive counterweights attached to said blades to rotate them in said one direction and spring means operatively connected between said piston means and said hub to assist said counterweights in moving said blades in said one direction, second means acting on said blades urging them in the opposite direction towards minimum pitch and reverse pitch comprising said piston means, a fluid reservoir, pump means having an inlet connected to said reservoir, valve means mounted externally of said hub and shaft and having a discharge port connected to said reservoir, conduit means connecting the outlet of said pump means with said piston means and with the inlet port of said valve means, said valve means having a member adapted to be moved to a bypass position for bypassing fluid from said conduit means to said reservoir thereby stopping the flow of fluid to said piston means, and second link means connecting said piston means with said member of said valve means for moving said member into said bypass position when the pitch of said blades reach a predetermined value.

6. The propeller as described in claim 5 further comprising governor means positioned between said pump and said conduit means for regulating the flow of fluid to said piston means and adapted to provide a flow of fluid thereto when the rotational speed of the propeller drops below a predetermined value and to reverse the flow when the rotational speed exceeds a predetermined value.

7. In a variable pitch propeller; a hub adapted to be rotated with an engine shaft, propeller blades rotatably mounted in said hub, first means acting on said blades urging them in one direction to change the pitch thereof towards maximum pitch and a feathered position and comprising centrifugally responsive counterweights and spring means, second means acting on said blades urging them in the opposite direction towards minimum pitch and reverse pitch and comprising a hydraulic motor mounted on said hub for rotation therewith and axial movement thereon, conduit means for supplying fluid under pressure to said motor and means external of said shaft and hub for controlling said supply of fluid to said motor for selectively adjusting the pitch of said blades at any position between said reverse pitch and said feathered position and comprising, a fluid reservoir, pump means having a suction inlet connected to said reservoir and also having a pressure outlet, valve means mounted externally of said shaft and hub and having a discharge port connected to said reservoir and also having first and second ports, means connecting the outlet of said pump means to said first port, means connecting said second port with said conduit means, a valve member within said valve means moveable therein for selectively connecting said second port with said first port and with said discharge port, and link means operatively connecting said motor means with said valve member for substantially closing off the connection between said first and second ports and opening the connection between said second and discharge ports when the pitch of said blades reaches a predetermined value.

8. The propeller as claimed in claim 7 further comprising manual means for adjusting said valve member to obtain a range of pitch values at which said valve member closes off the connection between said first and second ports.

9. In a variable pitch propeller; a hub adapted to be rotated with an engine shaft, propeller blades rotatably mounted in said hub, means for changing the pitch of said blades in one direction from the reverse pitch position to a feathered position comprising a combination of centrifugally responsive counterweights and spring means, means for changing the pitch in the opposite direction from feather to reverse comprising a hydraulic motor means mounted on said hub for rotation therewith and axial movement thereon, means for supplying fluid under pressure to said hydraulic motor means, governor control means to regulate the flow of said fluid to and from said hydraulic motor means, valve means mounted externally of said propeller to limit the flow of fluid to said motor at a predetermined pitch value, link means connecting said valve means with said pitch changing means for sensing the propeller pitch value at which said valve means will limit the flow of fluid to said motor means, and means for manually adjusting said link means to obtain a prescribed pitch value at which said valve means limits flow to said motor means.

10. A variable pitch propeller comprising; an engine drive shaft, a hub mounted on said drive shaft, blades mounted radially on said hub for rotational movement about their axes, centrifugally responsive counterweights attached to said blades tending to rotate them in one direction about their axes, hydraulic piston means mounted on said hub for relative axial movement therewith, link means connecting said piston means with said blades for changing the pitch thereof upon movement of said piston means in opposition to the action of said counterweights, spring means cooperating with said counterweights tending to aid the counterweights in opposition to said piston means, a hydraulic reservoir, a pump receiving fluid from said reservoir and supplying same to said piston means under pressure, valve means mounted externally of said hub and shaft and having an inlet port connected to the discharge port of said pump and a discharge port connected to said reservoir, second link means operatively connecting said hydraulic piston means with said valve means for opening said valve means thereby connecting said inlet and discharge ports when said piston means reaches a predetermined position, and a manual control lever connected to said second link means for adjusting the position of said piston at which said valve is made to open.

11. A propeller as described in claim 10 including governor means regulating the flow of fluid from said pump to said piston means in such a manner as to provide flow of fluid to the piston when the rotational speed of the propeller drops below a predetermined value and reverses the flow when the rotational speed exceeds a predetermined value.

12. The propeller as claimed in claim 11 in which said second link means comprises abutments attached to opposite sides of said piston means and each having a hole therein, a spaced pair of aligned abutment members secured to said hub on each side thereof in axial alignment with one of the abutments on said piston means and each member of said pair having a hole therein in axial alignment with the hole in the pertaining abutment on said piston means, a guide rod for each abutment on said piston means extending through the hole in said abutments and the holes in the pertaining pair of abutment members, adjustable nuts threaded on one end of each said guide rod on the side of the abutment away from the pertaining pair of abutment members, a double flanged yoke surrounding said drive shaft for axial movement relative thereto and rotational movement therewith, said yoke being attached to the remaining end of each said guide rod for axial movement therewith, a collar fixed to each said guide rod and positioned thereon between the pertaining pair of abutment members, a spring positioned on each said guide rod between said collar and the abutment member of the said pair which is closer to the abutment on said piston means, said spring being biased to urge said collar towards the other abutment member of said pair, a block member mounted within the flanges on said yoke for axial movement therewith, a lever having one end pivotally attached to said block member, a link having one end pivotally attached to the other end of said lever, said valve means being operatively connected to said lever at a pivotal junction between the ends thereof, and a manually operated lever pivotally attached to the remaining end of said link for manual positioning of said valve means in order to predetermine the pitch setting at which said valve means opens to bypass fluid from said pump back to said reservoir.

13. A variable pitch propeller comprising; an engine drive shaft, a hub mounted on said drive shaft, propeller blades radially mounted on said hub for rotational movement about their axes, centrifugally responsive counterweights attached to said blades tending to rotate them in one direction about their axes, hydraulic piston means mounted on said hub for relative axial movement therewith, link means connecting said piston means with said blades for changing the pitch thereof upon axial movement of said piston means in opposition to the action of said counterweights, spring means cooperaing wih said counterweights tending to aid the counterweights in opposition to said piston means, a hydraulic reservoir, a pump receiving fluid from said reservoir and supplying the same under pressure to said piston means, valve means mounted externally of said hub and shaft and having an inlet port connected to the discharge port of said pump and having a discharge port connected to said reservoir, governor means regulating the flow of fluid from said pump to said piston means in such a manner as to provide flow of fluid to said piston when the rotational speed of the propeller drops below a predetermined value and reverses the flow when the rotational speed exceeds a predetermined value, second link means operatively connecting said hydraulic piston means with said valve means for opening said valve means thereby connecting said inlet and discharge ports when said piston means reaches a predetermined value, and a manual control lever connected to said second link means for adjusting the position of said piston means at which said valve means is made to open, said control lever being adapted to be moved into feathering, normal, and reverse pitch operations, when said control lever is in said normal position said valve means is adaptable to provide some passage of fluid therethrough to permit said governor means to regulate the flow of fluid from said pump to said piston means.

14. A variable pitch propeller comprising; an engine drive shaft, a hub mounted on said shaft for rotation therewith, propeller blades rotatably mounted in said hub, hydraulic piston means mounted on said hub for axial movement thereon, first link means connecting said piston means with said blades for changing the pitch thereof upon movement of said piston means, first means acting on said blades urging them in one direction to change the pitch thereof towards maximum pitch and a feathered position and comprising centrifugally responsive counterweights attached to said blades to rotate them in said one direction and spring means operatively connected between said piston means and said hub to assist said counterweights in moving said blades in said one direction, second means acting on said blades urging them in the opposite direction towards minimum pitch and reverse pitch comprising said piston means, a fluid reservoir, pump means having an inlet connected to said reservoir, valve means mounted externally of said hub and shaft and having a discharge port connected to said reservoir, conduit means connecting the outlet of said pump means with said piston means and with the inlet port of said valve means, said valve means having a valve member moveable in one direction into a bypass position for bypassing fluid from said conduit means to said reservoir thereby stopping the flow of fluid to said piston means and in the opposite direction to interrupt said bypass, and elements of abutment means operatively connected to said piston means and said valve member adapted for abutment when said piston is moved into a predetermined position by a supply of fluid from said pump means and operable to move said valve member in said one direction only.

15. A variable pitch propeller according to claim 14 in which the abutment element pertaining to said valve member is connected thereto by a second linkage means, and manual means connected to said second linkage means for adjustment thereof to predetermine the position of said piston means in which said element of said abutment means will abut.

References Cited by the Examiner

UNITED STATES PATENTS

| 2,698,147 | 12/1954 | Hovgard | 170—135.75 |
| 3,057,410 | 10/1962 | Biermann | 170—160.21 |

FOREIGN PATENTS

| 1,104,473 | 6/1955 | France. |
| 553,929 | 6/1943 | Great Britain. |

MARK NEWMAN, *Primary Examiner.*

JULIUS E. WEST, *Examiner.*

W. E. BURNS, *Assistant Examiner.*